US005995517A

United States Patent [19]

Tomida et al.

[11] Patent Number: 5,995,517

[45] Date of Patent: Nov. 30, 1999

[54] MULTIPLEXED DIGITAL SIGNAL RECEIVING DEVICE CAPABLE OF MINIATURIZING THE CONFIGURATION OF A SIGNAL RECEIVING PORTION

[75] Inventors: Yoshikazu Tomida; Hironori Mitoh; Masahiro Sata, all of Osaka, Japan

[73] Assignee: Sanyo Electric Co., Ltd., Osaka, Japan

[21] Appl. No.: 08/786,338

[22] Filed: Jan. 23, 1997

[30] Foreign Application Priority Data

| | | | |
|---|---|---|---|
| Jan. 31, 1996 | [JP] | Japan | 8-016132 |
| Jan. 31, 1996 | [JP] | Japan | 8-016133 |

[51] Int. Cl.[6] .......... H04L 7/00

[52] U.S. Cl. .......... 370/486; 340/487; 340/538; 340/542

[58] Field of Search .......... 370/486, 487, 370/538, 542, 490, 493, 498, 522, 543

[56] References Cited

U.S. PATENT DOCUMENTS

| | | | |
|---|---|---|---|
| 4,829,569 | 5/1989 | Seth-Smith et al. | 380/10 |
| 5,497,372 | 3/1996 | Nankoh et al. | 370/69.1 |
| 5,602,992 | 2/1997 | Danneels | 395/200.19 |
| 5,719,873 | 2/1998 | Yamashita et al. | 370/513 |
| 5,734,780 | 3/1998 | Ichiura et al. | 386/46 |
| 5,784,462 | 7/1998 | Tomida et al. | 380/21 |

OTHER PUBLICATIONS

A4–2FM Multiplex Broadcasting System "DARC", 1994 Vehicle Navigation & Information Systems Conference Proceedings, Masayuki Takada et al., pp. 111–116.

*Primary Examiner*—Daniel J. Wu
*Attorney, Agent, or Firm*—Nikaido, Marmelstein, Murray & Oram LLP

[57] ABSTRACT

An FM multiplexed broadcasting signal received by an antenna and FM-demodulated by an FM tuner portion is demodulated by a demodulation LSI into a digital signal corresponding to packet data. The digital signal is successively supplied by every packet to a CPU of a receiving portion. The CPU of the receiving portion removes unnecessary data of the received data and then supplies only data required for a CPU of a personal computer via a buffer without delay from the reception. When a transferred packet is a successive reproduction program packet or a time information packet, the CPU of the personal computer calculates latency required before a predetermined data analysis processing is started, and performs data analysis processing in an elapse of the latency. Responsively, reconfiguration of program data is performed and corresponding character information or the like is output to a displaying portion.

11 Claims, 11 Drawing Sheets

TRANSFER DATA (24 BYTES)

MULTIPLEXED DIGITAL SIGNAL RECEIVING DEVICE CAPABLE OF MINIATURIZING THE CONFIGURATION OF A SIGNAL RECEIVING PORTION

BACKGROUND OF THE INVENTION

1. Field of the Invention

The present invention relates to a multiplexed digital signal receiving device which receives multiplexed digital broadcasting in which the main information signal is multiplexed with additional information data, and more particularly to a multiplexed digital signal receiving device capable of displaying character data or the like transmitted by FM multiplex broadcasting on a screen of a personal computer.

2. Description of the Background Art

As broadcast offering new services, FM multiplex broadcasting multiplexing digital signals with existing FM stereo broadcasting signals in their vacant frequency baseband spectra is now being developed for practical use.

FM multiplex broadcasting system is new media multiplexing digital signals in a frequency band higher than that of sound signals of existing FM stereo broadcasting to broadcast traffic information, character and graphic information, and the like. The FM multiplex broadcasting system is characterized in that, a frequency can be used effectively, broadcast equipment can be implemented simply, and that data can be received in mobiles and the like, whereby traffic information can be easily transmitted to mobiles such as automobiles, and the like.

Thus, FM multiplex broadcasting has partly been put to practical use as means for transmitting traffic jam information or the like to automobiles or the like mounted with a receiver in real time or means for providing an inexpensive transmission path through which a user having a handy type receiver can access necessary information any time and anywhere.

Prior to describing a configuration of a conventional FM multiplex broadcasting receiving device, a data structure in FM multiplex broadcasting will first be outlined.

In FM multiplex broadcasting, the cause of degradation of reception state includes multipath interference and fading interference. In particular, mobile reception generally has very poor transmission path characteristics. Even in such a case, a system which achieve complete reception at one time, if possible, is desirable. Practically, however, transmitted data sometimes cannot be completely received through one reception and in that case, it is assumed that retransmitted data is received to interpolate data which was not received. FM multiplex broadcasting service area is desirably equivalent to FM stereophonic broadcasting service area. However, even in the service area, some places have a large average bit error rate. Thus, a structure of data transmitted has an error correction system therefor and a frame configuration thereof determined taking such poor transmission path characteristics into consideration.

Specifically, the error caused by extreme voltage drop due to fading interference is fatal and sometimes uncorrectable. Thus, the unit data length of transmitted data is matched to the average burst length of an error caused by fading so that when an uncorrectable error is caused, the whole unit data including the uncorrectable error can be replaced with retransmitted unit data to interpolate the data.

Furthermore, because of the high error correction effect, a product code obtained by arranging two block codes orthogonally is used as the error correction method.

Therefore, data has a two-dimensional frame configuration including an error correction code both in the longitudinal and lateral directions.

Transmission data has a hierarchical layered structure with data in the above described one frame as an elementary unit.

As a specific example of the above description, an FM multiplex broadcasting system disclosed in *Proc. of Vehicle Navigation & Information Systems Conference* (1994) A4-2 pp. 111–116 will be described.

FIG. 9 shows a specification of a hierarchical layered structure of the data described above.

In a layer 1, transmission path characteristics are defined. A multiplexed signal is overlapped on the side of frequency higher than that of an L+R signal and an L−R signal which are ordinary FM stereo broadcast signals.

As this overlapping method, a method called LMSK (Level controlled Minimum Shift Keying) is employed which controls the level of the multiplex signal by the degree of modulation of the L−R signal, taking into consideration the fact that the interference of a multiplex signal with a sound signal is significant when the degree of modulation of sound is small.

In a layer 2, a frame configuration of data including an error correction system is defined. Each frame is formed of 272 blocks in the column direction with a 16-bit BIC (Block Identification Code) added at the head. Based on the BIC, frame synchronization and block synchronization are carried out. 190 blocks out of 272 blocks in the column direction are packets which transmit data, and 82 blocks are parity packets transmitting parity in the column direction. Each packet is structured of a 176-bit information portion, a 14-bit CRC (Cyclic Redundancy Code) serving as an error correction code and an 82-bit parity portion in the row direction.

More specifically, with this one frame as an elementary unit, transmission data first is error-corrected at this stage.

In actually sending data, packets and parity packets are rearranged in a predetermined order in the vertical direction, as shown in FIG. 12, rather than with such a configuration as layer 2 shown in FIG. 10, and then the data is sent.

In a layer 3, a structure of a data packet is defined. The data packet includes 176 bits excluding the BIC, the CRC and the parity of each row (packet) from the frame.

Further, the data packet is structured of a prefix and a data block. The prefix includes information for identifying the content of data, designating, for example, to which program content, to be described later, the data packet belongs.

In a layer 4, a structure of a data group is defined. The data group is formed of one or a plurality of data blocks. More specifically, based on information within prefixes in data packets, data blocks are arranged in the order of data packet number and from a data block with a data packet number of 0 through a data block having an information end flag set within the prefix, to configure a data group. The data group also includes the CRC which is an error correction code and transmitted data is error-corrected also in this layer. One data group corresponds to one display unit, that is, data of one page.

A layer 5 defines a block of information data transmitted through FM multiplex broadcasting, that is, the structure of program data. FIG. 10 shows the configuration of this program data.

A program of character and/or graphic information is structured of a plurality of data groups. The head data group includes encoded information associated with the entire program, such as program number and the total number of pages, as program management data. There are a plurality of page data subsequent to the program management data, and data of each page is encoded.

The program data and the page data are each structured of a data header portion and a data unit portion. The data unit portion is configured of a plurality of data units into which a character data portion, a photographic graphic data portion and the like are divided for each encoding method.

More specifically, in the above described data structure, the program data is formed into a group of data representing one block of information on the receiving side. Taking traffic information as an example, program information represents the congestion or the like at each junction of a specific road (expressway). In the case of a weather report, program information represents weather report information and the like for a specific area.

Displaying in an FM multiplex broadcasting receiving device which receives the FM multiplex broadcasting described above is performed on a liquid crystal display screen generally having a display area of one page (corresponding to 15.5 characters×2.5 lines in displaying in Japanese).

Thus, the display area is disadvantageously small for a program having a plurality of pages or the like and thus the program becomes difficult to see.

In order to solve this problem, the method has been proposed in which a large amount of data received is held in a personal computer and displayed on a display screen of the personal computer.

FIG. 11 is a block diagram of a conventional example of an FM multiplex broadcasting receiving device which employs a personal computer.

An FM multiplex broadcasting receiving device 100 includes: a data receiving portion configured of an antenna 12 receiving FM radio wave, an FM tuner portion 14 receiving an output of antenna 12 and performing FM demodulation, and an FM multiplex decoding portion 15 receiving an output of FM tuner portion 14 to extract a baseband signal and perform error correction for outputting a corresponding digital signal; and a personal computer 120 (a data analysis processing portion) receiving a digital signal to configure unit data for displaying (i.e., page data) and display a corresponding character.

An FM multiplex signal received by antenna 12 is detected in an FM demodulation circuit 2 of FM tuner portion 14 in synchronization with a local oscillating wave output from a PLL circuit 4, and is output to FM multiplex decoding portion 15 via a buffer 6.

FM multiplex decoding portion 15 receives the demodulated signal via buffer circuit 8, extracts a signal component in a predetermined frequency range through a bandpass filter 18, and then performs LMSK demodulation, synchronization detection and error correction in a demodulation LSI 20.

A CPU 26 receives a data transfer request from demodulation LSI 20 every 18 msec and reads received data from demodulation LSI 20. When uncorrectable packet data exist therein, CPU 26 deletes the data, and selects and outputs only data required for displaying.

An RAM 28 stores data from CPU 26 every 18 msec by one packet, and operates as a buffer for outputting data to an interface 30.

When CPU 26 detects the personal computer 120 has been accessed, an address decoder 32 outputs data from interface 30.

A controller 34 typically receives output data from interface 30 and outputs data to personal computer 120. In starting up the device, however, initialization between interface is performed based on data stored in an ROM 36.

Personal computer 120 receives data output from FM multiplex decoding portion 15 via an interface 38. A CPU 40 receives output data, that is, packet data from interface 38 and selects a desired data packet according to the layered structure shown in FIG. 9. Then, CPU 40 extracts a data block from the data packet, reconfigures a data group of the data block and performs error correction for the data group.

Furthermore, CPU 40 extracts a data header and a group of data units corresponding to page data from data group data within a data group to reconfigure program data.

The reconfigured program data is stored with each program successively stored in a memory 44 by the page data. CPU 40 selects a predetermined number of pages of page data and outputs the page data to a displaying portion 42. Displaying portion 42 outputs corresponding character information or graphic information based on the received page data.

For a note type personal computer, a liquid crystal flat panel display is used as displaying portion 42 and the display area has a resolution of 640×400 dots or more.

The type of the program of FM multiplex broadcasting described above includes a successive reproduction program and a recorded program. The successive reproduction program is an information program which accompanies the content of an FM broadcasting (a main program), and displays, for example, information such as the title, the name of the singer and the like of the song currently played in a music program.

The recorded program is an information program which is not related to the content of an FM broadcasting, and displays, for example, information such as news, weather reports, traffic information and the like.

The practice limitations on FM multiplex broadcasting specify that decode processing for the successive reproduction program described above is timed to coincide with the packet reception a specified number of blocks (302 blocks) after the packet involved is received.

Thus, in a conventional FM multiplex broadcasting receiving device, the data receiving portion first determines whether or not received data is a successive reproduction program. Simultaneously the data receiving portion is also required to start counting the number of blocks received to set a decoding processing timing, and to transfer a signal which indicates the timing to the data analysis processing portion upon counting up 302 blocks.

A FM multiplex broadcasting also performs transmission of time information. In this case, it is specified that time setting is timed to coincide with reception of a packet with a specified block number two frames (one frame=272 blocks) after the packet data involved is received. Thus, as described above, the data receiving portion is required to count the number of blocks received to set a time timing, and to transfer the timing to the data analysis processing portion.

Furthermore, the configuration of a conventional FM multiplex broadcasting receiving device has the problem described below: when a liquid crystal flat panel display in a note type personal computer or the like is used as displaying portion 42, a plurality of pages can be displayed at one time and thus even a program over a plurality of pages can be displayed without any difficulty in seeing the program. Furthermore, since multiplexed data is held in the personal computer, various processing and modification can be applied to the data in the personal computer.

However, the conventional FM multiplex broadcasting receiving device described above requires RAM 28 for temporarily storing demodulated data in FM multiplex decoding portion 15. Thus, when the data receiving portion is made into a unit such as a PC card (a personal computer card), the existence of RAM 28, address decoder 32 which controls data transfer to and from personal computer 120 and the like hinders the miniaturization when the data receiving portion is made into a unit.

Received data is stored temporarily in RAM 28, and the data is transferred to personal computer 120 in response to a read command from CPU 40 of the personal computer. Thus, program analysis processing is not performed until a read command from the personal computer is issued and thus time delay is caused between data reception and signal processing so that displaying of received data is disadvantageously delayed.

Furthermore, since the time delay described above varies, signal processing performed with respect to the time of data reception is not stabilized.

Furthermore, the data transfer efficiency to the personal computer is poor, since demodulated data at a demodulation LSI in the data receiving portion do not go through selection and all of the data is transferred to the personal computer and only data required is selected and processed on the side of the personal computer.

SUMMARY OF THE INVENTION

An object of the present invention is to provide a digital signal receiving device of simple configuration capable of accurate reconfiguration of information even when the timing at which information processing is started is specified with respect to the time of the initial packet data reception by the number of data blocks received.

Another object of the present invention is to provide a digital receiving device which dispenses with memory means of an unnecessarily large capacity in the data receiving portion and thus is capable of miniaturizing the data receiving portion.

Still another object of the present invention is to provide a digital signal receiving device capable of reducing time delay between data reception in the data receiving portion and signal processing in the data analysis portion.

Still another object of the present invention is to provide a digital signal receiving device capable of improving data transfer efficiency between the data receiving portion and the data analysis portion.

In summary, the present invention contemplates a multiplexed digital signal receiving device which receives a multiplexed signal, the multiplexed signal being a main information signal multiplexed with a plurality of unit data, the plurality of unit data each including any of data into which each of a plurality of additional information data transmitted is divided. The multiplexed digital signal receiving device includes a data receiving unit, a data analysis unit and a display unit.

The data receiving unit receives a multiplexed signal and successively extracts and outputs unit data. The data receiving unit includes a demodulation circuit which receives and demodulates carrier wave transmitting unit data by a multiplexed signal, a multiplexed signal decoding circuit which receives an output of the demodulation circuit and extracts multiplexed unit data for outputting a corresponding digital signal, and a data output control circuit which receives a corresponding digital signal and outputs unit data of a predetermined data length by a fixed time defined autonomously. The date analysis unit receives and analyses an output of the data receiving unit to configure display screen data. The display unit receives display screen data and outputs a corresponding image.

Preferably, the data output control circuit receives a corresponding digital signal, and outputs unit data of a predetermined data length by a fixed time t. When the data analysis unit detects that additional information indicates that analysis for a specific unit data is started upon the reception of a predetermined number, n, of unit data after the specific unit data is received, the data analysis unit i) calculates a latency T=n×t by multiplying the predetermined number m by the fixed time t when the reception of the specific unit data is detected, ii) times the latency T following the detection of the specific unit data, and iii) starts to analyze the specific unit data in response to detection of elapse of the latency T.

Thus, a main advantage of the present invention is that the data receiving unit dispenses with a data storage circuit with large capacity and control of the interface with the data analysis unit is simplified so that the data receiving unit does not require a CPU with large processing capacity. Thus, a compact and inexpensive data receiving unit can be obtained.

Furthermore, in particular, if the data receiving unit is constituted by a portion which is structurally independent of the data analysis processing unit, the portion constituting the data receiving unit can be inexpensively implemented.

Another advantage of the present invention is that unnecessary time delay between data reception at data receiving unit and signal processing at the data analysis processing portion can be minimized. Thus, the display screen can be updated earlier, for example.

Still another advantage of the present invention is that data transfer efficiency between the data receiving unit and the data analysis processing unit can be improved and reliability of data analysis processing can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
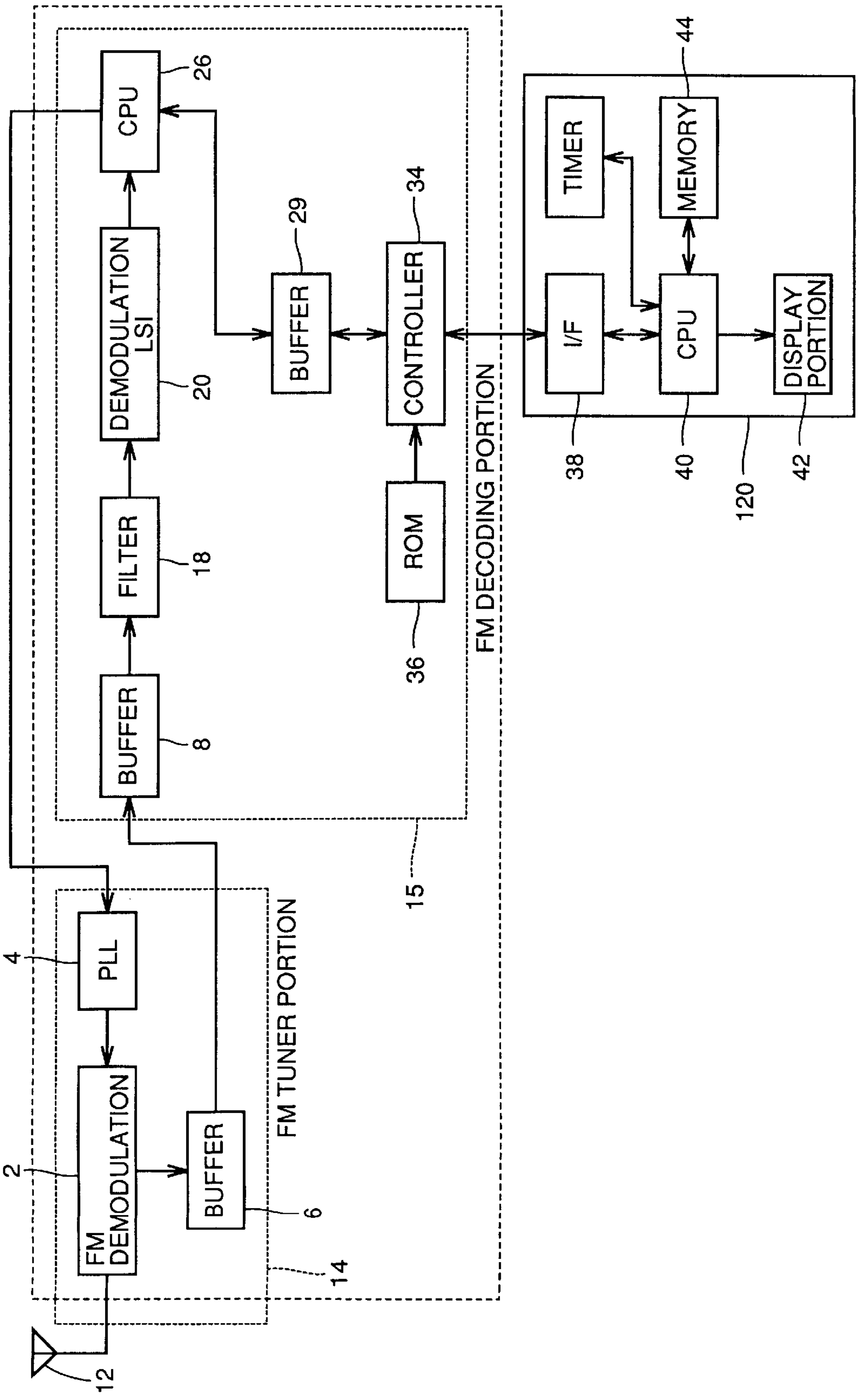
FIG. 1 is a schematic block diagram showing a configuration of an FM broadcasting receiving device according to a first embodiment of the present invention.
Figure 2:
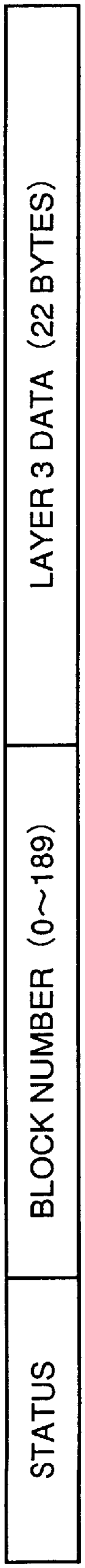
FIG. 2 shows a configuration of one packet of transfer data in FM multiplex broadcasting.
Figure 11:
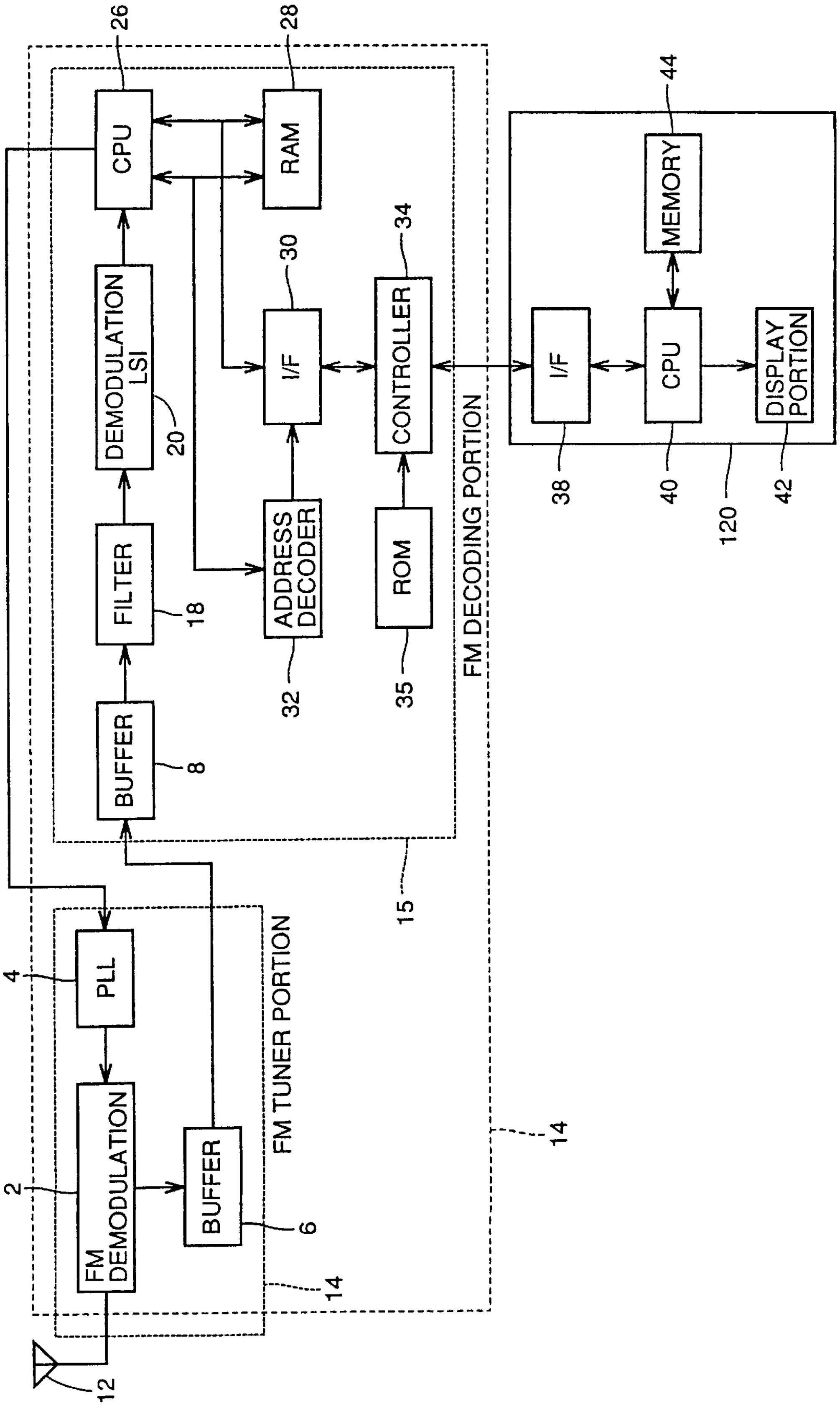
FIG.11 PRIOR ART
FIG. 11 is a schematic block diagram of a conventional FM multiplex broadcasting receiving device.

FIG. 1 is a block diagram showing a configuration of an FM multiplex broadcasting receiving device according to a first embodiment of the present invention, as compared with FIG. 11.

Portions identical to those of the conventional example shown in FIG. 11 are designated with identical reference characters and a description thereof is not repeated.

FIG. 1 differs from FIG. 11 in that the address decoder and an RAM of FM multiplex recording portion 15 are removed and that a buffer 29 is arranged between CPU 26 and controller 34.

Buffer 29 includes a data buffer portion storing one packet (24 bytes) of data from CPU 26, a status buffer portion storing one byte of status from CPU 26, and a command buffer portion storing two bytes of command from CPU 40 of personal computer 120. The data buffer portion, the status buffer portion and the command buffer portion are configured of shift registers, respectively. The capacities of the data buffer portion, status buffer portion and command buffer portion depend on the specification of the information received and are not limited to the values mentioned above.

The hardware of personal computer 120 in FIG. 1 is the same in configuration as that of the conventional example shown in FIG. 11.

The one packet of data stored in the data buffer portion described above is structured of data of layer 3 (22 bytes), a block number (one byte) of the packet involved, and a status (one byte) configured of a flag or the like which indicates whether a synchronization information flag and the packet involved are laterally processed data (data to which error correction is applied only in the lateral direction) or longitudinally processed data (data to which error correction is applied also in the longitudinal direction following error correction in the lateral direction).

CPU 26 in FM multiplex decoding portion 15 receives one packet of data every 18 msec and transfers the data to personal computer 120 via buffer 29 and controller 34.

Meanwhile, CPU 40 of personal computer 120 receives packet data from FM multiplex decoding portion 15 via interface 38, performs program analysis and displays corresponding character data or graphic data. Furthermore, it transmits a command which, for example instructs tuning to CPU 26.

That is, in an FM multiplex broadcasting receiving device according to the first embodiment, FM multiplex recording portion 15 outputs packet data to personal computer 120 not in response to a data request signal from personal computer 120 but at a timing having a predetermined time interval determined by itself (every 18 msec in the example described above).

An operation of the FM multiplex broadcasting receiving device described above will now be described in detail. An operation of CPU 26 will first be described.

Figure 3:
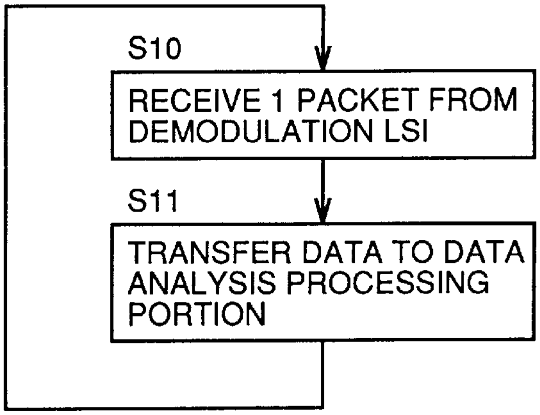
FIG. 3 is a flow chart of a main routine of CPU 26 shown in FIG. 1.

FIG. 3 is a flow chart illustrating the operation of CPU 26.

CPU 26 receives one packet of data transferred from demodulation LSI 20 every 18 msec (step S10). CPU 26 successively transfers the received data to data analysis processing portion 120 (step S11). When data transfer is completed, CPU 26 allows processing to be returned to step S10. Thus, the routine described above including steps S10 and S11 is repeated.

An operation of CPU 40 will now be described.

Figure 4:
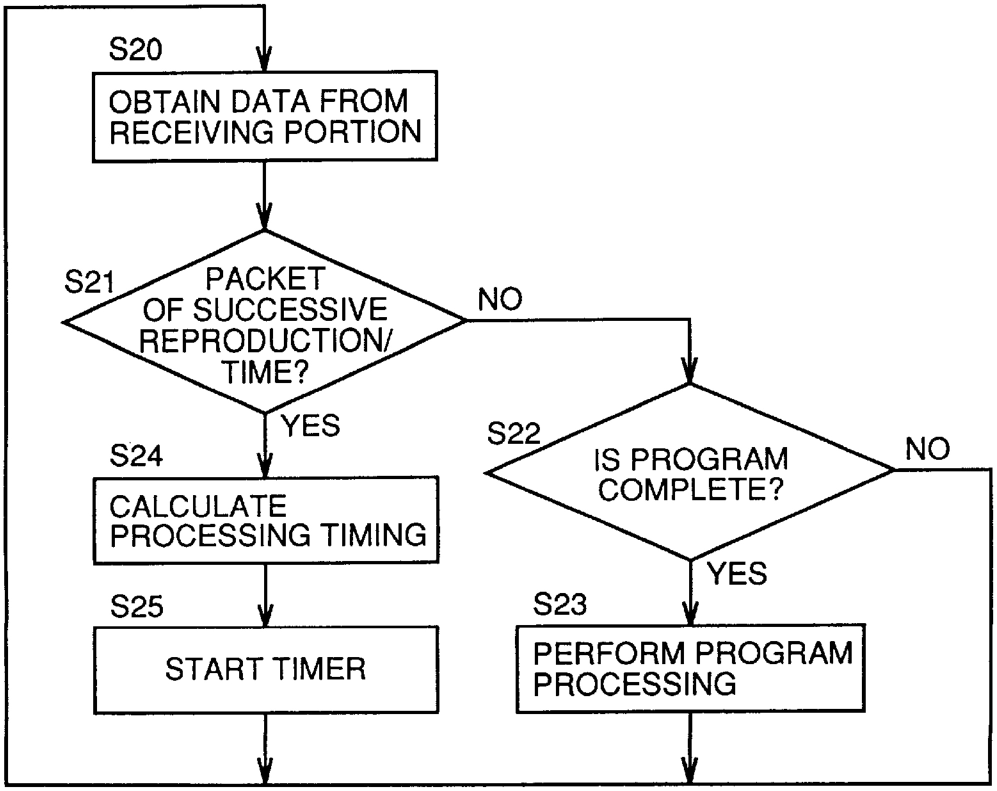
FIG. 4 is a flow chart of a main routine of CPU 40 shown in FIG. 1.

FIG. 4 is a flow chart illustrating a main routine of CPU 40.

Figure 9:
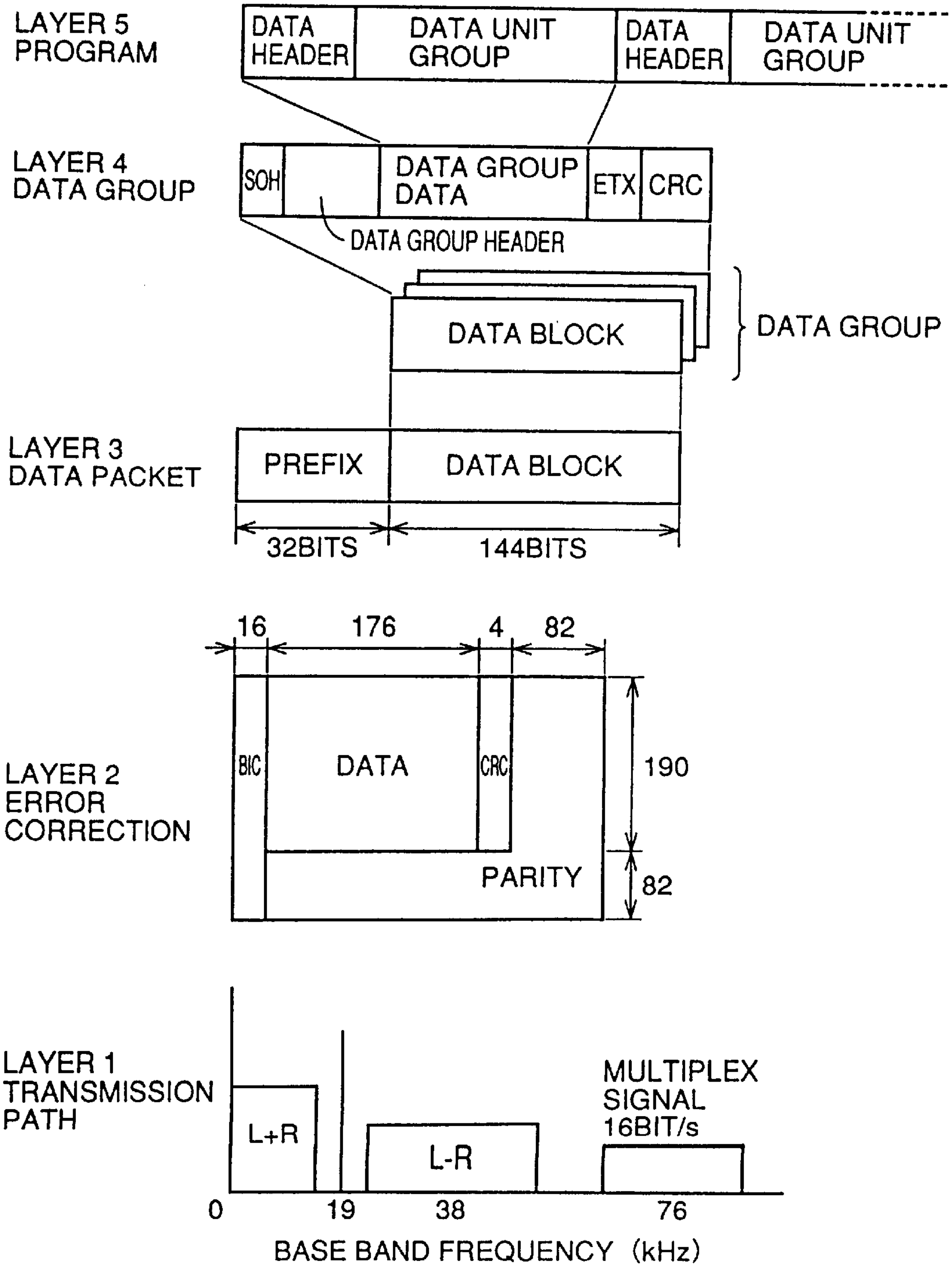
FIG.9 PRIOR ART
FIG. 9 shows a specification of FM multiplex broadcasting.
Figure 10:
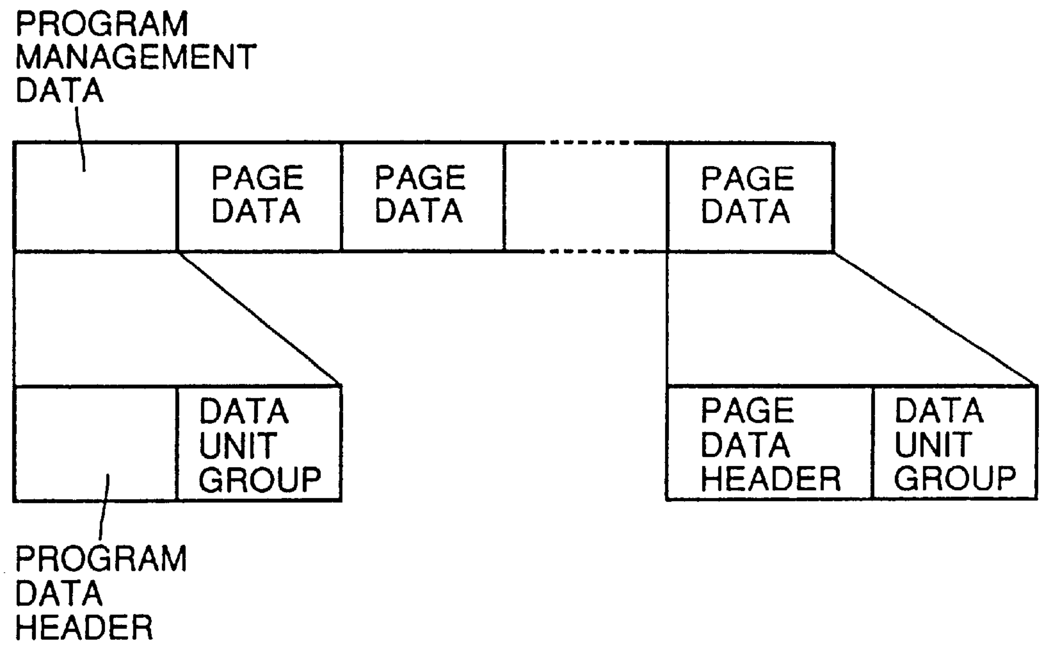
FIG. 10 PRIOR ART
FIG. 10 shows a configuration of program data.

CPU 40 receives one packet of data from FM multiplex decoding portion 15 (step S20). CPU 40 refers to the prefix of the received packet data (layer 3 shown in FIG. 9) to determine whether or not the packet is a successive reproduction program packet. Simultaneously it refers to the data block to determine whether or not the packet is a time information packet (step S21).

When a received packet is neither a successive reproduction program packet nor a time information packet in step S21, CPU 40 determines whether a program is completed by data having been received (step S22).

That is, typically one program is structured of a plurality of packets and thus a program cannot be complete if a received packet is not the final packet of the program. In that case, processing returns to steps S20 and the next packet is received. When the final packet of a program is received, the program is complete. In that case, a content of memory 44 is updated to confirm program processing. That is, program data in which reception is completed is displayed at displaying portion 42 (step S23).

The decision of whether a program is complete may depend on simply whether a packet received is the final packet of the program, as described above, or may depend on whether a data once having been unsatisfactorily received due to burst error, for example, and thus being insufficient to configure program data has now satisfactorily received.

On the other hand, when a received packet is a successive reproduction program packet or a time information packet in step S21, CPU 40 calculates a processing starting timing (step S24).

A calculation of the processing timing will now be described. For a successive reproduction program, decoding processing need be performed 302 blocks after the reception of the first packet of the successive reproduction program, as described above. Thus, in the first embodiment, decoding processing timing is obtained not by counting the number of blocks of data blocks received but by calculation in time equivalent, as described below.

That is, when the packet reception period t=18 msec, a latency T1 required from the reception of the first packet of the successive reproduction program through the starting of a decoding processing is represented by the following equation (1):

$$T1=302\times 18\ \text{msec}=5.436\ \text{sec} \tag{1}$$

Time information is written into any one packet of a predetermined frame every predetermined time. It is specified that time setting is timed to coincide with the reception of a packet with a specified block number which arrives two frames (one frame=272 blocks) after the reception of the packet involved.

Thus, a latency T2 required from reception of a time information packet until time setting processing is started is expressed in the following equation (2):

$$T2=[(272-n1)+272+n2]\times 18 \text{ msec} \quad (2)$$

wherein n1 is the block number of the time information packet, which can be obtained from status information from the demodulation LSI, and n2 is a specified block number, which has been previously written within a time information packet specified at a broadcasting station.

Data transferred to personal computer 120 includes laterally processed data and longitudinally processed data and the expressions (1) and (2) represent the case where laterally processed data is transferred. For longitudinal processed data, approximately one frame time is required for longitudinal error correction and thus when successive reproduction program and time information packets are properly transferred, approximately one frame time delay has been caused as compared with laterally processed data. Thus, the latency need have a time corresponding to approximately one frame subtracted in each of the expressions (1) and (2).

When a latency before a predetermined data analysis processing is calculated in step S24 shown in FIG. 4, an internal timer of CPU 40 starts to time the latency (step S25). When the processing of step S25 is completed, the main routine returns to step S20 and a timer process routine operates.

Figure 5:
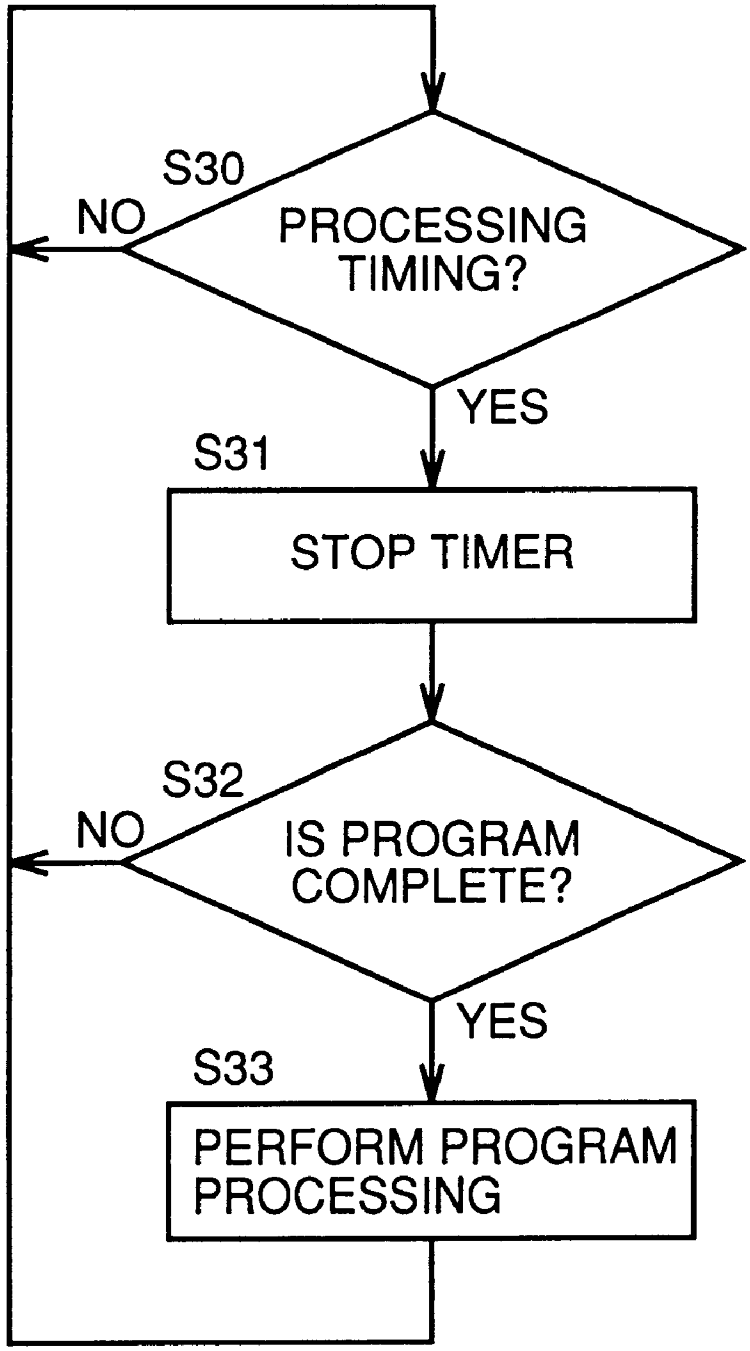
FIG. 5 is a flow chart of a timer process routine of CPU 40 shown in FIG. 1.

FIG. 5 is a flow chart illustrating the timer process routine.

Referring to FIG. 5, after the timer operation described above is started, CPU 40 determines whether a predetermined latency has elapsed and a process timing has occurred (step S30). When it determines that a processing timing has not yet occurred, CPU 40 returns processing to step S30. When it determines that a processing timing has occurred, CPU 40 stops the timer operation (step S31).

Then, CPU 40 determines whether a program is complete, as is in the processings of steps S22 and S23 shown in FIG. 4 (step S32). When a program is complete, program processing (step S33) are performed and processing then returns to step S30. When it is determined in step S32 that a program is not complete, processing returns to step S30 without performing a program processing.

With the configuration described above, FM multiplex decoding portion 15 is not required to count the number of blocks received in a successive reproduction program or a time program in order to detect a timing of decoding processing and thus can have its configuration simplified and hence inexpensive and miniaturized.

Figure 6:
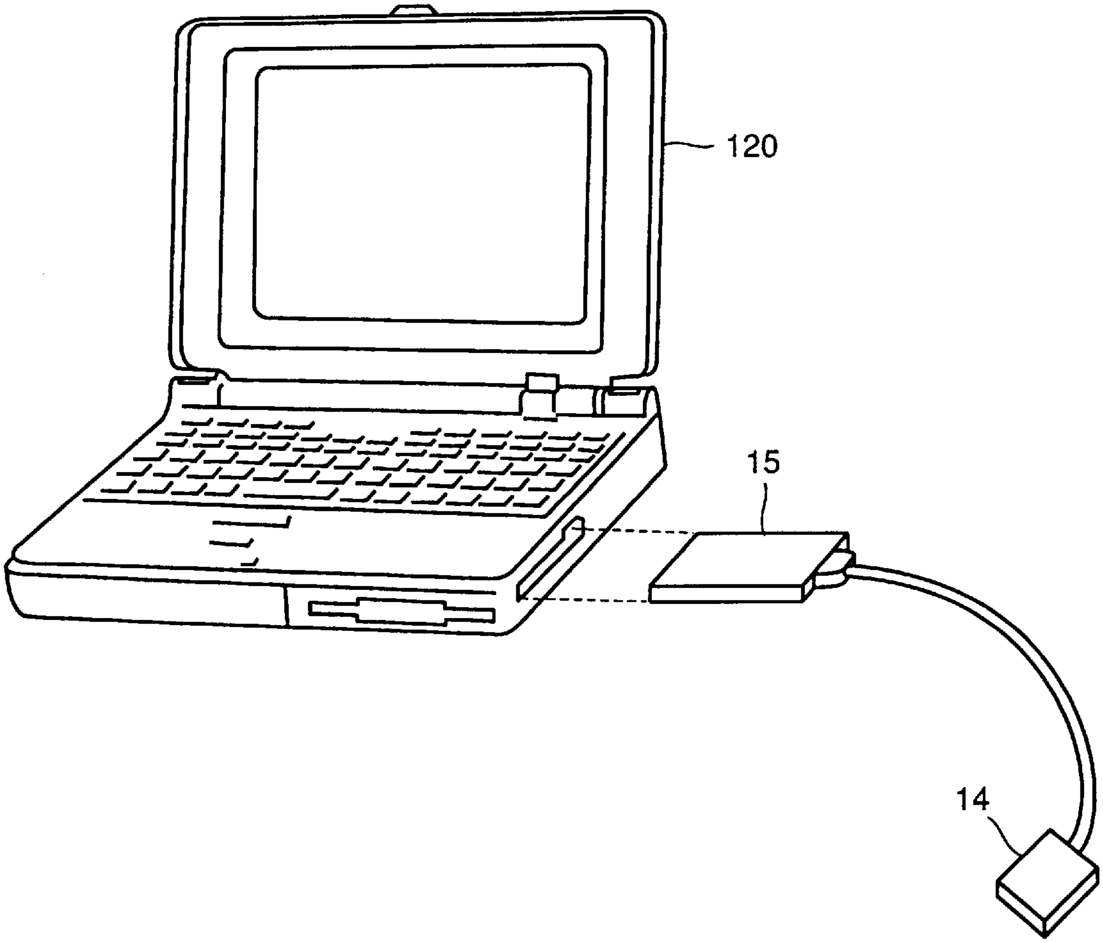
FIG. 6 is an exterior view of the FM multiplex broadcasting receiving device of the first embodiment.

FIG. 6 shows an appearance of FM multiplex broadcasting receiving device 100 shown in FIG. 1, configured of a notebook type personal computer and a PCMCIA (Personal Computer Memory Card International Association) card (referred to as a PC card hereinafter).

In this example, FM multiplex decoding portion 15 is made into a PC card and is removably mounted to personal computer 120. FM tuner portion 14 is connected to FM multiplex decoding portion 15 via a connection code. Such a configuration allows FM tuner portion 14 to be arranged remote from personal computer 120 and thus can prevent a received signal from being mixed with noise from personal computer 120.

Furthermore, FM tuner portion 14 and FM multiplex decoding portion 15 may be integrated, rather than connected by a connection code, as shown in FIG. 6, to be formed into a handy type.

Second Embodiment

An FM multiplex broadcasting receiving device according to a second embodiment of the present invention is similar in configuration to that of the first embodiment shown in FIG. 1 except for the operation of CPU 26 in the FM multiplex decoding portion, as described below.

An operation of the FM multiplex broadcasting receiving device according to the second embodiment of the present invention, more specifically an operation of CPU 26, will now be described.

Figure 7:
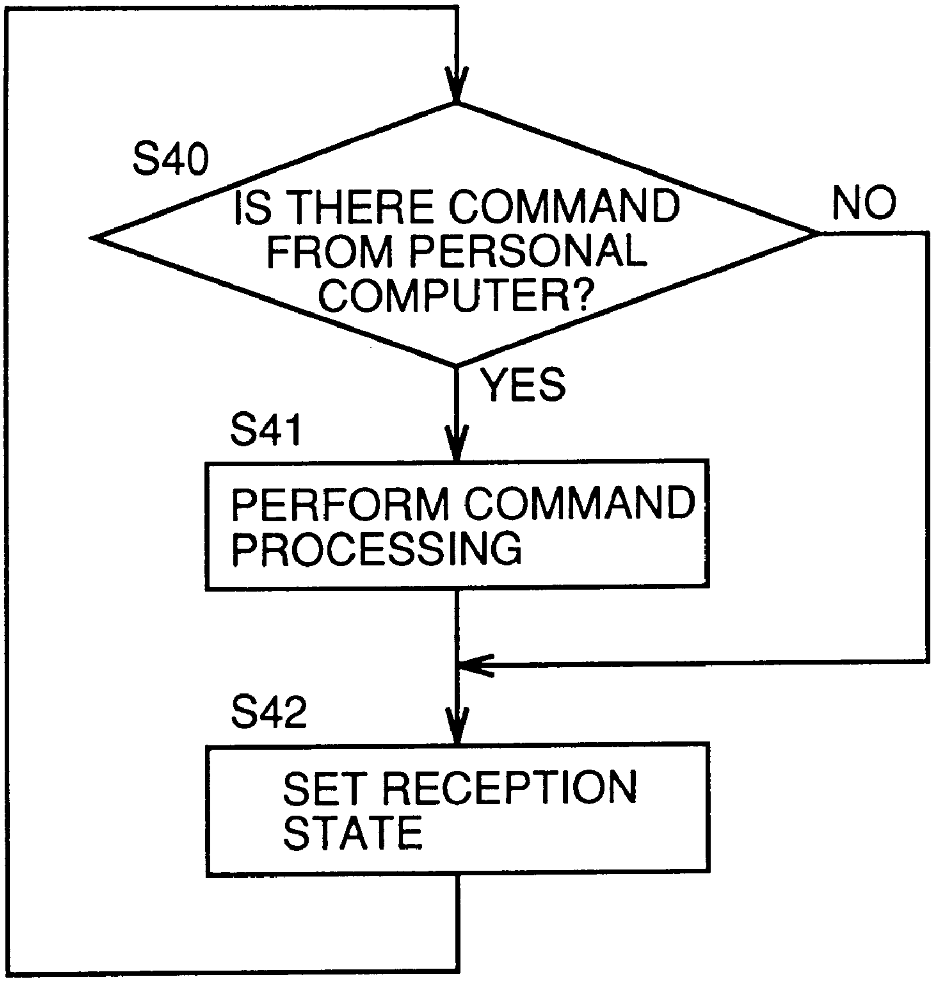
FIG. 7 is a flow chart of a main routine of CPU 26 according to a second embodiment of the present invention.

FIG. 7 is a flow chart illustrating a main routine of the operation of CPU 26.

First, CPU 26 determines whether a command such as a tuning format from personal computer 120 exists (step S40). If a command from personal computer 120 exists and the command is, for example, a channel-select instruction, CPU 26 sets a predetermined channel-select frequency to perform a command processing (step S41). After a channel-select frequency is set, a reception state of monophoric/stereophonic and non-detection/detection of FM broadcasting as status data is set at the status buffer portion of buffer 29 (step S42). When it is determined in step S40 that no command exist, CPU 26 allows processing to go directly to step S42. When the processing of step S42 is completed, processing again returns to step S40 and the main routine is thus repeated.

Figure 8:
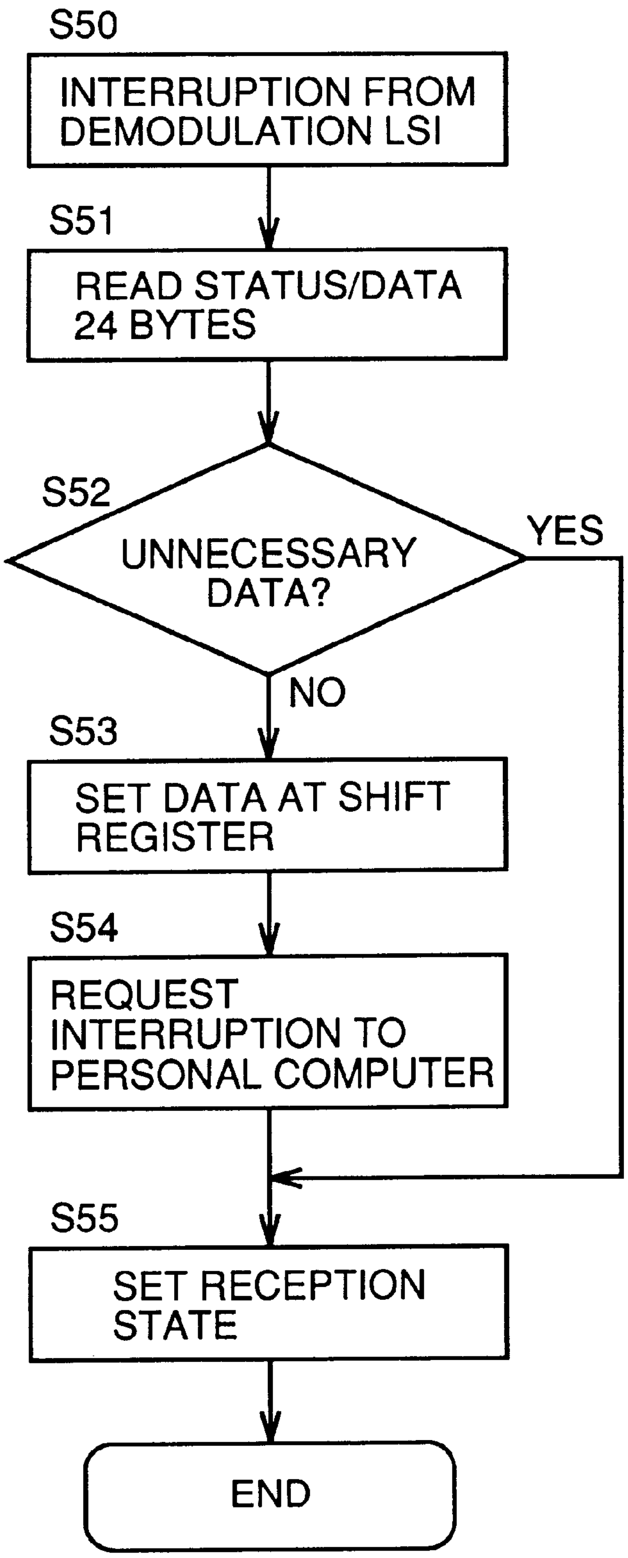
FIG. 8 is a flow chart of a reception interrupt routine of CPU 26 in the second embodiment.

FIG. 8 is a flow chart illustrating a reception interruption routine of CPU 26.

Figure 12:
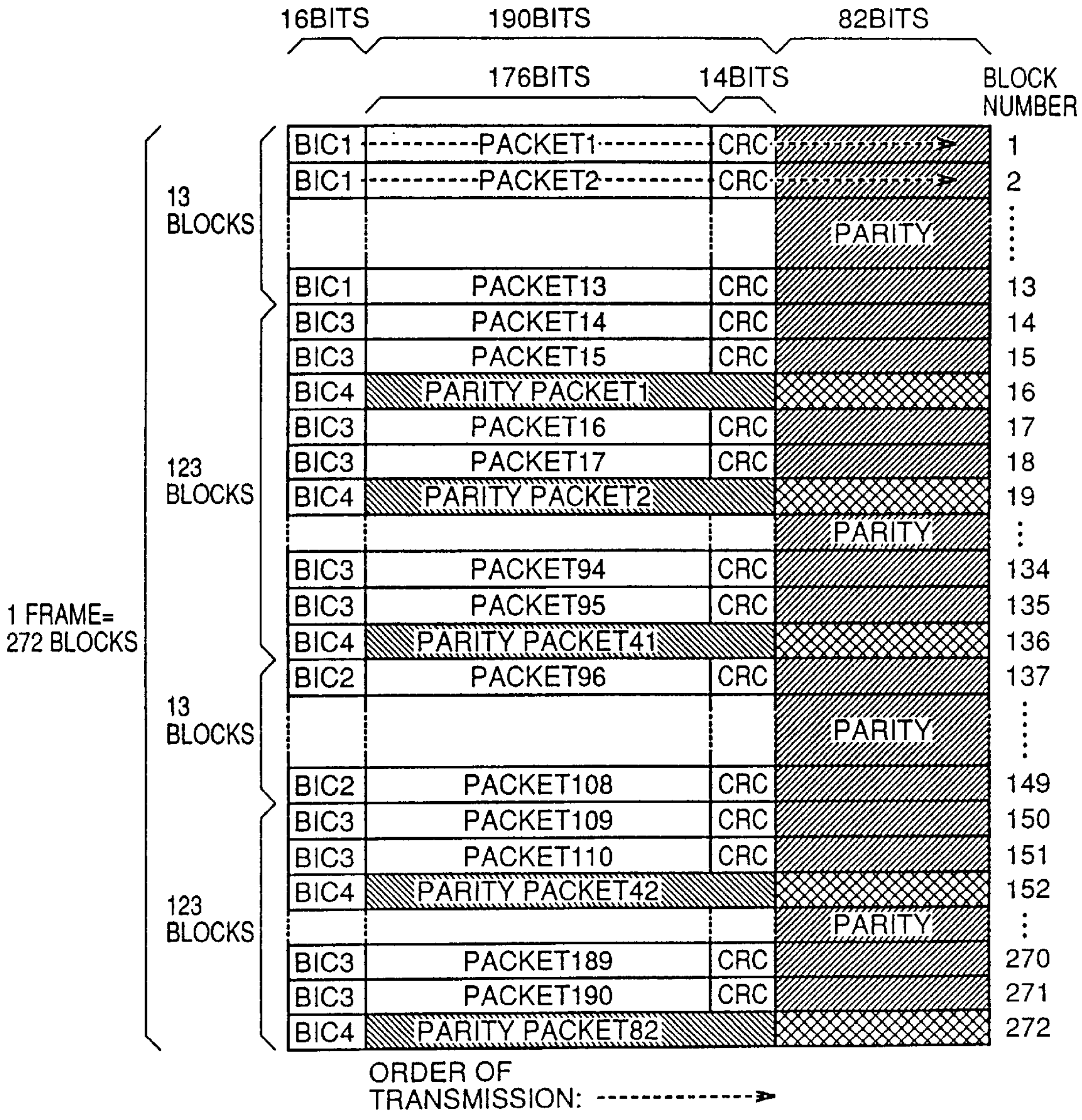
FIG. 12 PRIOR ART
FIG. 12 shows one example of a configuration of a frame sent in FM multiplex broadcasting.

CPU 26 receives one packet of data transferred from demodulation LSI 20 every 18 msec. In response to the transfer, an interruption to CPU 26 is caused (step S50). CPU 26 reads the status indicating the state of a packet data and the data from an output of demodulation LSI 20 (step S51). Then it determines whether the packet data is an unnecessary packet (step S52). That is, it determines whether the packet data is unnecessary data such as a parity packet, data having an error, charged program data, paging data of a different ID, a fill packet and data specified by the personal computer as unnecessary. The parity packet herein is a packet including a parity for performing longitudinal error correction of data of one frame, as shown in FIG. 12, and the paging data of a different ID is data which transmits predetermined data from a broadcasting station to a specific recipient who is different from the recipient of the receiving device involved.

Whether or not packet data is unnecessary is determined based on the status of an output of demodulation LSI 20 and a command from the personal computer which is set in the command buffer of buffer 29. When CPU 26 determines that the data is not unnecessary, CPU 26 sets the data in the data buffer portion of buffer 29 (step S53) and then outputs an interruption request signal to CPU 40 of the personal computer.

Then, CPU 26 sets a reception state such as an on/off state of frame synchronization, an on/off state of block synchronization and existence/non-existence of error, as a status in the status buffer portion of buffer 29 (step S55). When CPU 26 determines in step S52 that packet data is unnecessary data, CPU 26 does not output an interruption request signal and allows processing to go to step S55. When the processing of step S25 is completed, the interruption routine is completed. Such a configuration can minimize unnecessary time delay between data reception at a data receiving portion and signal processing at a data analysis processing portion (a personal computer) and thus earlier updating of a display screen can be achieved.

Furthermore, data transfer efficiency from the data receiving portion to the data analysis is processing portion and hence reliability in data processing can be improved.

In the second embodiment also, FM multiplex broadcasting receiving device 100 can be configured using a notebook type personal computer and a PC card, as shown in FIG. 6 of the first embodiment, in which example a similar effect to that of the first embodiment can be achieved.

The frame configuration of the data of FM multiplex broadcasting described above is a so-called "method B" system applied in Japan and the United States. The present invention is not limited to this frame configuration and is applicable to other frame configurations of FM multiplex broadcasting.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiplexed digital signal receiving device receiving a multiplex signal, said multiplex signal being a main information signal multiplexed with a plurality of unit data, said plurality of unit data each including any of data into which each of a plurality of additional information data transmitted is divided, said multiplexed digital signal receiving device comprising:

data receiving means for receiving said multiplex signal and successively extracting and outputting said unit data, said data receiving means including demodulation means for receiving and demodulating carrier wave transmitting said unit data by a multiplex signal, multiplex signal decoding means for receiving an output of said demodulation means and extracting and outputting multiplexed said unit data as a corresponding digital signal, and data output control means for receiving said corresponding digital signal and determining timing of transferring every unit data of a predetermined length with an output of an interruption signal, said multiplexed digital signal receiving device further comprising data analysis means for receiving said unit data from said data receiving means in response to said interruption signal and analyzing said unit data to configure display screen data; and displaying means for receiving said display screen data and outputting a corresponding image.

2. The multiplexed digital signal receiving device according to claim 1, wherein said data output control means selects unit data to be output according to an instruction for a selecting condition from said data analysis means.

3. The multiplexed digital signal receiving device according to claim 1, wherein each said unit data includes attribute data indicating to which of said plurality of additional information data each said unit data belongs, and any of said divided additional information data, and wherein said data output control means includes storage means for receiving and outputting in series said unit data of the predetermined data length successively received, and means for controlling an output operation to said data analysis means according to an instruction for a selecting condition from said data analysis means and to the attribute data for said unit data of the predetermined data length held in said storage means.

4. The multiplexed digital signal receiving device according to claim 3, wherein:

said data analysis processing means is included in a personal computer; and said data receiving means is connected to said personal computer via a removal interface portion.

5. A multiplexed digital signal receiving device receiving a multiplex signal, said multiplex signal being a main information signal multiplexed with a plurality of unit data, each of said unit data including any of data into which each of a plurality of additional information data transmitted is divided, said multiplexed digital signal receiving device comprising:

data receiving means for receiving said multiplex signal and successively extracting and outputting said unit data, said data receiving means including demodulation means for receiving and demodulating carrier wave transmitting said unit data by a multiplex signal, multiplex signal decoding means for receiving an output of said demodulation means and extracting and outputting multiplexed said unit data as a digital signal, and data output control means receiving said corresponding digital signal and outputting unit data of a predetermined data length every fixed time t; said multiplexed digital signal receiving device further comprising:

data analysis means for receiving and analyzing an output of said data receiving means and configuring display screen data, said data analysis means, when detecting that said additional information indicates that analysis of a specific unit data is started upon reception of a predetermined number, n, of unit data since said specific unit data is received, i) calculating a latency $T=n\times t$ by multiplying said predetermined number n by said fixed time t when the reception of said specific unit data is detected, ii) timing said latency T when said specific unit data is detected, and iii) starting analysis of said specific unit data in response to detection of elapse of said latency T; said multiplex digital signal receiving device further comprising:

display means for receiving said display screen data and outputting a corresponding image.

6. A multiplexed digital signal receiving device receiving a multiplex signal, said multiplex signal being a main information signal multiplexed with a plurality of unit data, each of said unit data including any of data into which each of a plurality of additional information data transmitted is divided, said multiplexed digital signal receiving device comprising:

data receiving means for receiving said multiplex signal and successively extracting and outputting said unit data, said data receiving means including demodulation means for receiving and demodulating carrier wave transmitting said unit data by a multiplex signal, multiplex signal decoding means for receiving an output of said demodulation means and extracting and outputting multiplexed said unit data as a digital signal every fixed time t, and data output control means receiving said corresponding digital signal and outputting unit data of a predetermined data length;

said multiplexed digital signal receiving device further comprising:

data analysis means for receiving and analyzing an output of said data receiving means and configuring display screen data, said data analysis means, when detecting that said additional information indicates that analysis of a specific unit data is started upon reception of a predetermined number, n, of unit data since said specific unit data is received, i) calculating a latency T=n×t by multiplying said predetermined number n by said fixed time t when the reception of said specific unit data is detected, ii) timing said latency T when said specific unit data is detected, and iii) starting analysis of said specific unit data in response to detection of elapse of said latency T; said multiplex digital signal receiving device further comprising display means for receiving said display screen data and outputting a corresponding image.

7. The multiplexed digital signal receiving device according to claim 6, wherein:

said data output control means selects unit data to be output according to an instruction for a selecting condition from said data analysis means.

8. The multiplexed digital signal receiving device according to claim 6, wherein each said unit data includes attribute data indicating to which of said plurality of additional information data each said unit data belongs, and any of said divided additional information data, and wherein said data output control means includes storage means holding said unit data of the predetermined data length successively received, and means controlling an output operation to said data analysis means according to an instruction for a selecting condition from said data analysis means and to the attribute data for said unit data of the predetermined data length held in said storage means.

9. The multiplexed digital signal receiving device according to claim 8, wherein:

said data analysis processing means is included in a personal computer; and said data receiving means is connected to said personal computer via a removal interface portion.

10. The multiplexed digital signal receiving device according to claim 8, wherein:

said multiplex signal is an FM multiplex signal having a main sound signal multiplexed with additional information data;

said additional information is successive reproduction program data accompanying said main sound; and said specific unit data is a first data of said successive reproduction program data.

11. The multiplexed digital signal receiving device according to claim 8, wherein:

said multiplex signal is an FM multiplexed signal having a main sound signal multiplexed with additional information data;

said additional information is time program data; and said specific unit data is a first data of said time program data.

* * * * *